(No Model.)
R. R. GUBBINS.
WHEEL TIRE.
No. 508,306. Patented Nov. 7, 1893.
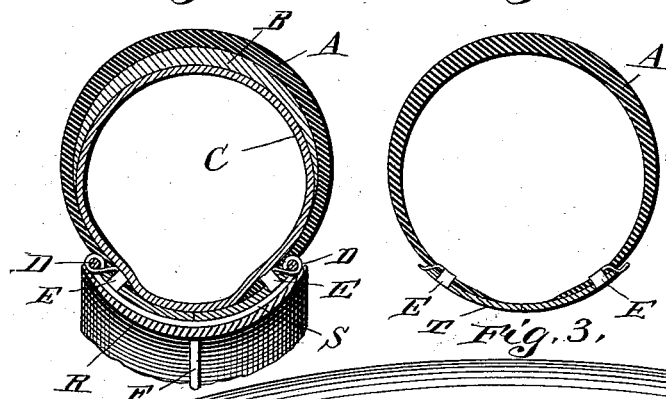
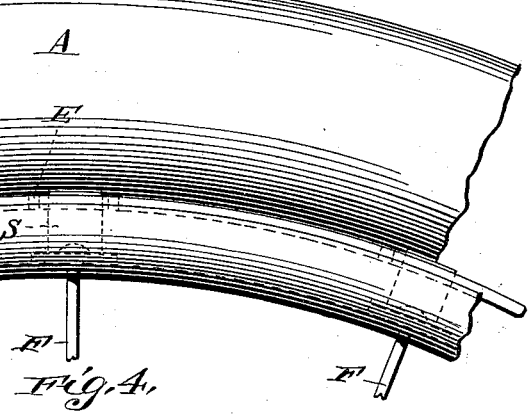
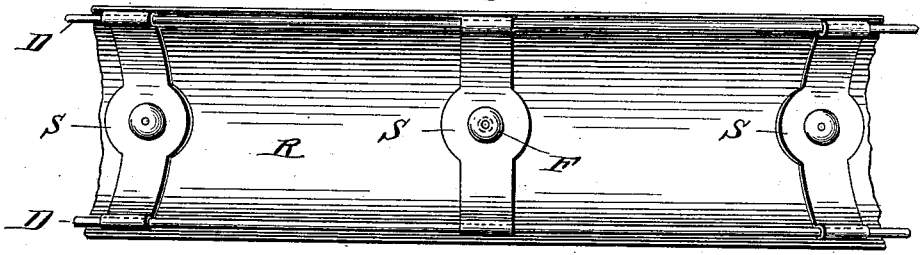
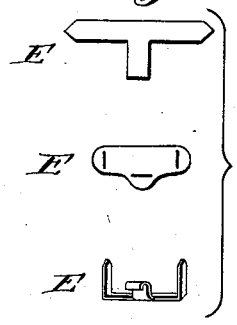
Witnesses:
Frederick Francis Edwards
Albert Joseph Judd
Inventor:
Richard Russell Gubbins,
per John Pitt Bayly,
His attorney in fact

UNITED STATES PATENT OFFICE.

RICHARD RUSSELL GUBBINS, OF BELVEDERE, ENGLAND.

WHEEL-TIRE.

SPECIFICATION forming part of Letters Patent No. 508,306, dated November 7, 1893.

Application filed September 21, 1892. Serial No. 446,485. (No model.) Patented in England August 18, 1892, No. 14,918, and in Germany May 27, 1893, No. 68,901.

*To all whom it may concern:*

Be it known that I, RICHARD RUSSELL GUBBINS, a subject of the Queen of Great Britain, residing at Belvedere, in the county of Kent, England, have invented a new and useful Tire for the Wheels of Bicycles and other Vehicles, (for which I have obtained a patent in Germany, No. 68,901, bearing date May 27, 1893, and in Great Britain, No. 14,918, bearing date August 18, 1892,) of which the following is a specification.

My invention relates to means for securing pneumatic tires to wheels, and its object is to provide an improved construction of the same, whereby the tire can be readily detached for repairs or other purposes and replaced on the wheel with ease and facility.

The invention consists in the novel construction and combination of parts hereinafter fully described and claimed.

In the accompanying drawings—Figure 1 is a cross sectional view of the rim of a bicycle wheel with my improvements applied thereto. Fig. 2 is a similar view of the tire cover removed, also showing the chafing strip. Fig. 3 is a side elevation of a portion of a wheel constructed in accordance with my invention. Fig. 4 is an edge view of the rim of the wheel, the tire being removed. Fig. 5 is a detail view showing the hooks used for connecting the tire cover with the rim.

In the said drawings, the letter A designates the tire cover consisting of a strip of india rubber or other flexible material, provided with a row of hooks E, along each side, a short distance from the edge.

The letter F designates the spokes of the wheel and R the rim which consists of a metal plate or plates bent over into concavo-convex form, as usual. Extending around this rim near each side or edge is an annular ring D, which rings are secured in place by means of light spring metal clips S, having apertures at their centers through which the spokes pass and having their ends bent around the rings D.

The letter C designates the air tube which rests upon a chafing strip interposed between said tube and the rim R. This strip may be made of raw or vulcanized rubber or other suitable material. The air tube is made of rubber as usual and is inflated in the ordinary manner.

The tire cover A almost entirely surrounds the air tube or tire and is secured in place by the hooks E engaging with the rings D, which hooks are clinched around the rings. A strip B may be interposed between the cover and air tube if desired, for protecting said tube.

In practice the chafing strip is placed in position in the hollow of the rim, covering the clips S and the ends of the spokes. The tube C is then partly inflated and placed in position, the chafing strip preventing it from being injured. The cover A is now secured in place by forcing its edges between the rings D and air tube C, and engaging the hooks E with the rings. The air tube is now inflated fully and will be securely held in place.

Having thus described my invention, what I claim is—

1. The combination in a wheel of the character described, of the concavo-convex rim, the spokes, the annular rings seated in said rim, the clips connected with the ends of the spokes and having their ends bent around said rings, the air tube, the cover extending partly around said tube and the hooks secured to said cover and engaging with the rings, substantially as described.

2. The combination in a wheel of the character described, of the concavo-convex rim, the spokes, the annular rings seated in said rim, the clips connected with the ends of the spokes and having their ends bent around said rings, the air tube, the cover extending partly around said tube and provided with hooks which engage with said rings, and the chafing strip interposed between said rim and air tube, substantially as specified.

RICHARD RUSSELL GUBBINS.

Witnesses:
FREDK. J. NAYLOR,
140 *Leadenhall Street, London, E. C., Notary Public.*
ERNEST STENTIFORD,
*His Clerk,* 140 *Leadenhall Street, London, E. C.*